(12) United States Patent
Gao et al.

(10) Patent No.: US 8,391,876 B2
(45) Date of Patent: Mar. 5, 2013

(54) INTERFERENCE MANAGEMENT FOR DISTRIBUTED ANTENNA SYSTEMS

(75) Inventors: Long Gao, Santa Clara, CA (US); Joydeep Acharya, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 206 days.

(21) Appl. No.: 12/805,769

(22) Filed: Aug. 19, 2010

(65) Prior Publication Data

US 2012/0046038 A1    Feb. 23, 2012

(51) Int. Cl.
    H04W 40/00    (2009.01)
(52) U.S. Cl. .................. 455/447; 455/446; 455/450
(58) Field of Classification Search ............ 455/447, 455/446, 450
    See application file for complete search history.

(56) References Cited

U.S. PATENT DOCUMENTS

| | | | |
|---|---|---|---|
| 6,917,580 B2 | 7/2005 | Wang et al. | |
| 2005/0207385 A1* | 9/2005 | Gorokhov et al. | 370/344 |
| 2005/0220002 A1* | 10/2005 | Li et al. | 370/208 |
| 2007/0248178 A1 | 10/2007 | Zhu et al. | |
| 2008/0205336 A1 | 8/2008 | Lee et al. | |
| 2008/0212703 A1 | 9/2008 | Han et al. | |
| 2010/0099451 A1 | 4/2010 | Saban et al. | |
| 2010/0232384 A1* | 9/2010 | Farajidana et al. | 370/329 |
| 2011/0141982 A1* | 6/2011 | Zhang et al. | 370/329 |

FOREIGN PATENT DOCUMENTS

KR    10-2009-0005793 A    1/2009

OTHER PUBLICATIONS

Suh et al., "Downlink Interference Alignment"; http://arxiv.org/abs/1003.3707; May 27, 2010.
Spencer et al., "Zero-forcing methods for downlink spatial multiplexing in multiuser MIMO channels", IEEE Transactions on Signal Processing; pp. 461-471; Feb. 2004.
"Further Advancements for E-UTRA Physical Layer Aspects (Release 9)"; http://ftp.3gpp.org/specs/ archive/36_series/36.814/; Mar. 2010.

* cited by examiner

Primary Examiner — Chuong A Ngo
(74) Attorney, Agent, or Firm — Mattingly & Malur, P.C.

(57) ABSTRACT

A central base station for interference management in a distributed antenna system comprises a processor; a memory; and a frequency partition module configured to divide the remote radio heads into clusters and allocate a frequency band to each cluster. Multiple clusters use the same frequency band and groups of clusters are formed. A joint scheduler is configured, for each group, to activate at most two clusters at any given time and deactivate remaining clusters in the group, one of the at most two activated clusters being a serving cluster of the group, and to associate one or more users with the serving cluster in the group. An interference alignment module is configured to apply downlink interference alignment between the at most two activated clusters in each group to align transmit directions of all interferences between the at most two activated clusters.

18 Claims, 9 Drawing Sheets

INTERFERENCE MANAGEMENT FOR DISTRIBUTED ANTENNA SYSTEMS

BACKGROUND OF THE INVENTION

The present invention relates generally to wireless systems and, more particularly, to interference management for distributed antenna systems.

In a distributed antenna system (DAS), multiple distributed antennae are set up in a geographical region and are connected via fiber to a centralized Base Station (CBS) which manages these antennae. The antennae are grouped into clusters which serve users (UEs).

Frequency partitioning is a well-known concept used to eliminate inter-cell interference in cellular networks. FIG. 1 shows an example of a cellular network where different sectors of a cell are assigned different frequency bands (d1, d2, d3) so that co-channel interference is minimized at adjacent sectors of different cells. For example, in cell C6, the sector with frequency band "d1" does not have any neighboring sectors operating at the same frequency band. Thus, co-channel interference from neighboring cells is completely eliminated and only weak interference is received from far away cells.

Another well-known concept pertinent to interference management is downlink interference alignment. Interference alignment (IA) is a Physical layer technique used to minimize the impact of co-channel interference. Different from frequency partitioning, IA attempts to align the transmit directions of all interferers so that all the interference at the receiver is aligned in the same direction (or subspace). Interference alignment can be done in several dimensions including frequency, time, and space (e.g., antennas). FIG. 2 shows a schematic diagram with three base stations performing interference alignment for downlink transmission.

In Changho Suh et al., "Downlink Interference Alignment," http://arxiv.org/abs/1003.3707, 2010, the authors present a downlink IA technique where space dimension is used to align interference. FIG. 3 (FIG. 2 in the original Suh et al. paper) shows the illustration in Suh et al. of a two-cell network with BS $\alpha$ and $\beta$ each employing a fixed precoder P. Each cell has two users. The matrix $H_{\alpha k}$ indicates the channel matrix between BS $\alpha$ and the $k^{th}$ user associated with it. The matrix $G_{\beta k}$ indicates the interference channel matrix between BS $\beta$ and the $k^{th}$ user associated with BS $\alpha$. In order to align the interference, the $k^{th}$ user computes the null vector, $u_{\alpha k}$, corresponding to the effective interference channel matrix $G_{\beta k}P$ such that $u_{\alpha k}G_{\beta k}P=0$. Next, the user feeds back the effective channel matrix, $u_{\alpha k}H_{\alpha k}P$, to BS $\alpha$. These steps are repeated by all users for the two cells as shown in FIG. 3. Next, each BS computes the ZF-precoding matrices for the overall effective channel matrix (e.g., the effective channel matrix for BS $\alpha$ is $H_\alpha=[u_{\alpha 1}H_{\alpha 1}P; u_{\alpha 2}H_{\alpha 2}P]$). The ZF-precoding matrices can be computed using the technique disclosed in Q. H Spencer, A. L. Swindlehurst & M. Haardt, "Zero-forcing methods for downlink spatial multiplexing in multiuser MIMO channels," IEEE Transactions on Signal Processing, pp. 461-471, February 2004. The entire disclosures of these two references are incorporated herein by reference.

BRIEF SUMMARY OF THE INVENTION

Exemplary embodiments of the invention provide a way to manage interference in a distributed antenna system. The proposed technique restricts the number of interfering clusters by frequency partitioning and cluster scheduling and subsequently employs interference alignment (IA) to manage the remaining interference. Interference alignment is the key technology which manages inter-cluster interference. As discussed above, although conventional IA algorithms can work for multiple interferers, as the number of interferers increase, the complexity of the IA algorithms and feedback overhead also go up exponentially, rendering the algorithms unsuitable for practical implementation. According to embodiments of this invention, a DAS-based network can be designed to restrict the maximum number of interfering clusters to one. This is achieved via frequency planning or partitioning and cluster scheduling. Moreover, modifications to the conventional IA algorithm are proposed for use in the present system to reduce implementation complexity at the UE.

An aspect of the present invention is directed to a central base station for interference management in a distributed antenna system which includes a plurality of users and a plurality of remote radio heads. The central base station comprises a processor; a memory; and a frequency partition module configured to divide the remote radio heads into clusters and allocate a frequency band to each cluster so that remote radio heads in each cluster have the same frequency band. Multiple clusters use the same frequency band and groups of clusters are formed, each group of clusters using the same frequency band. A joint scheduler is configured, for each group, to activate at most two clusters at any given time and deactivate remaining clusters in the group, one of the at most two activated clusters being a serving cluster of the group, and to associate one or more users with the serving cluster in the group. An interference alignment module is configured to apply downlink interference alignment between the at most two activated clusters in each group to align transmit directions of all interferences between the at most two activated clusters.

In some embodiments, the frequency partition module decides on a frequency reuse factor which determines how many different frequency bands are being reused among the groups of clusters in the distributed antenna system. Each group has one serving cluster and at most one interfering cluster, the serving cluster having first strongest Reference Signal Received Power in the group and the at most one interfering cluster having the second strongest Reference Signal Received Power in the group.

Another aspect of the invention is directed to a method for interference management in a distributed antenna system which includes a central base station, a plurality of users, and a plurality of remote radio heads. The method comprises dividing the remote radio heads into clusters; allocating a frequency band to each cluster so that remote radio heads in each cluster have the same frequency band, wherein multiple clusters use the same frequency band and groups of clusters are formed, each group of clusters using the same frequency band; activating at most two clusters at any given time and deactivating remaining clusters in each group, one of the at most two activated clusters being a serving cluster of the group; associating one or more users with the serving cluster in the group; and applying downlink interference alignment between the at most two activated clusters in each group to align transmit directions of all interferences between the at most two activated clusters.

In specific embodiments, the method further comprises measuring by each user channels from the remote radio heads in the serving cluster and the at most one interfering cluster in the group to obtain the channel information; and providing the channel information to the central base station to be used for the activating, deactivating, and associating.

Another aspect of this invention is directed to a distributed antenna system comprising a central base station, a plurality of users, and a plurality of remote radio heads. The central base station includes a processor; a memory; and a frequency partition module configured to divide the remote radio heads into clusters and allocate a frequency band to each cluster so that remote radio heads in each cluster have the same frequency band. Multiple clusters use the same frequency band and groups of clusters are formed, each group of clusters using the same frequency band. A joint scheduler is configured, for each group, to activate at most two clusters at any given time and deactivate remaining clusters in the group, one of the at most two activated clusters being a serving cluster of the group, and to associate one or more users with the serving cluster in the group. An interference alignment module is configured to apply downlink interference alignment between the at most two activated clusters in each group to align transmit directions of all interferences between the at most two activated clusters.

In some embodiments, each user includes a user processor; a user memory; and a cluster association module configured to monitor reference signals from the clusters and, based on the monitored reference signals, identify a cluster with the first strongest Reference Signal Received Power and a cluster with the second strongest Reference Signal Received Power for the user. The joint scheduler is configured, for each group, to activate at most two clusters at any given time and deactivate remaining clusters and to associate one or more users with the serving cluster in the group, based on channel information provided by the users about the clusters in the group including channel information of the serving cluster and the at most one interfering cluster. Each user in a group further includes a channel estimation module configured to perform channel estimation of the remote radio heads in the serving cluster in the group; and an interference estimation module configured to perform interference estimation of the remote radio heads in the at least one interfering cluster in the group. The channel information including the channel estimation and the interference estimation is provided by the user to the joint scheduler of the central base station to be used for the activating, deactivating, and associating.

In specific embodiments, the interference alignment module is configured to determine transmitter and receiver processing filter weights for downlink interference alignment, encode the receiver processing filter weights in the DMRSs (Demodulation Reference Signals) for the users, and send the DMRSs and data to the clusters for transmission to the users. Each user includes a signal processor configured to decode the DMRS to determine the receiver processing filter weights and to demodulate the data using the DMRS.

These and other features and advantages of the present invention will become apparent to those of ordinary skill in the art in view of the following detailed description of the specific embodiments.

DETAILED DESCRIPTION OF THE INVENTION

Figure 1:
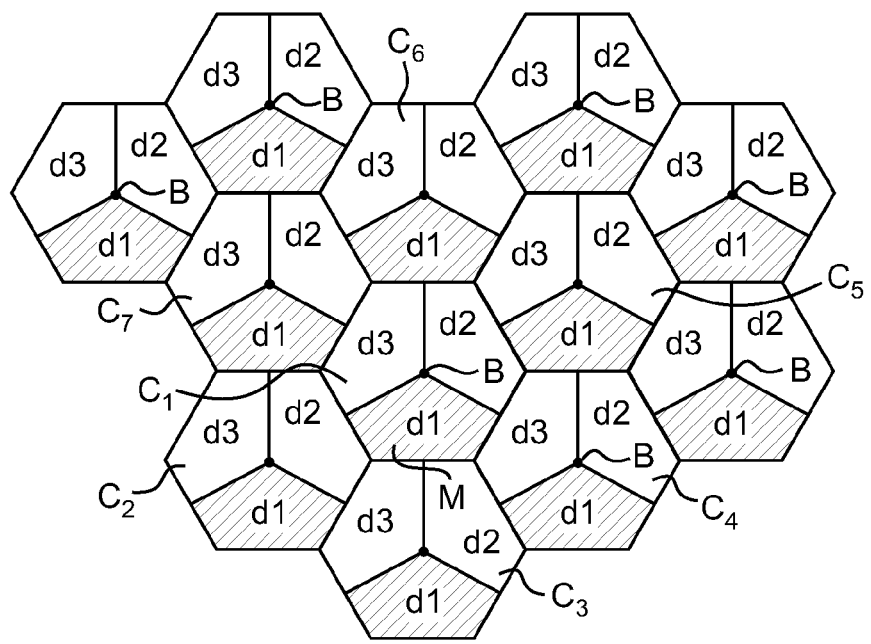
FIG. 1 shows an example cellular network where different sectors of a cell are assigned different frequency bands (d1, d2, d3) so that co-channel interference is minimized at adjacent sectors of different cells.
Figure 2:
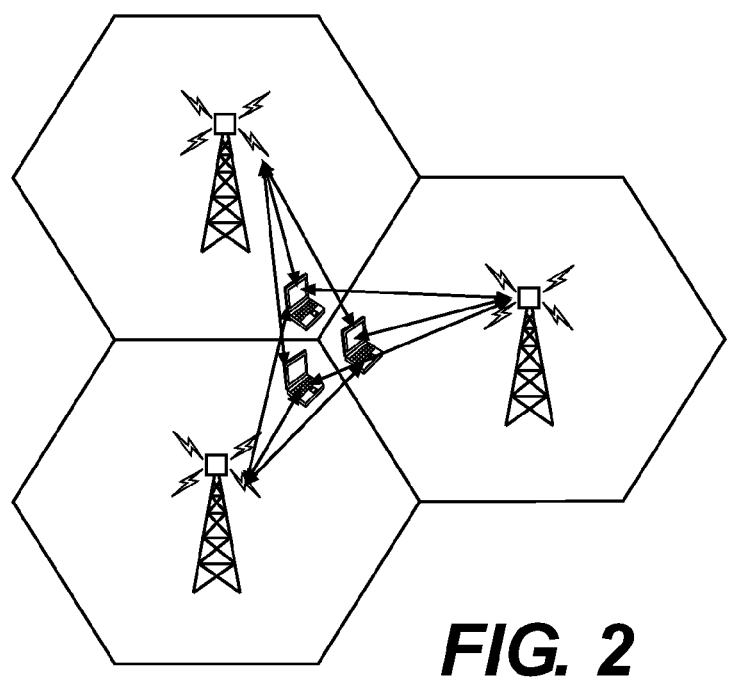
FIG. 2 shows a schematic diagram with three base stations performing interference alignment for downlink transmission.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for interference management in distributed antenna systems.

A. System Model

Figure 4:
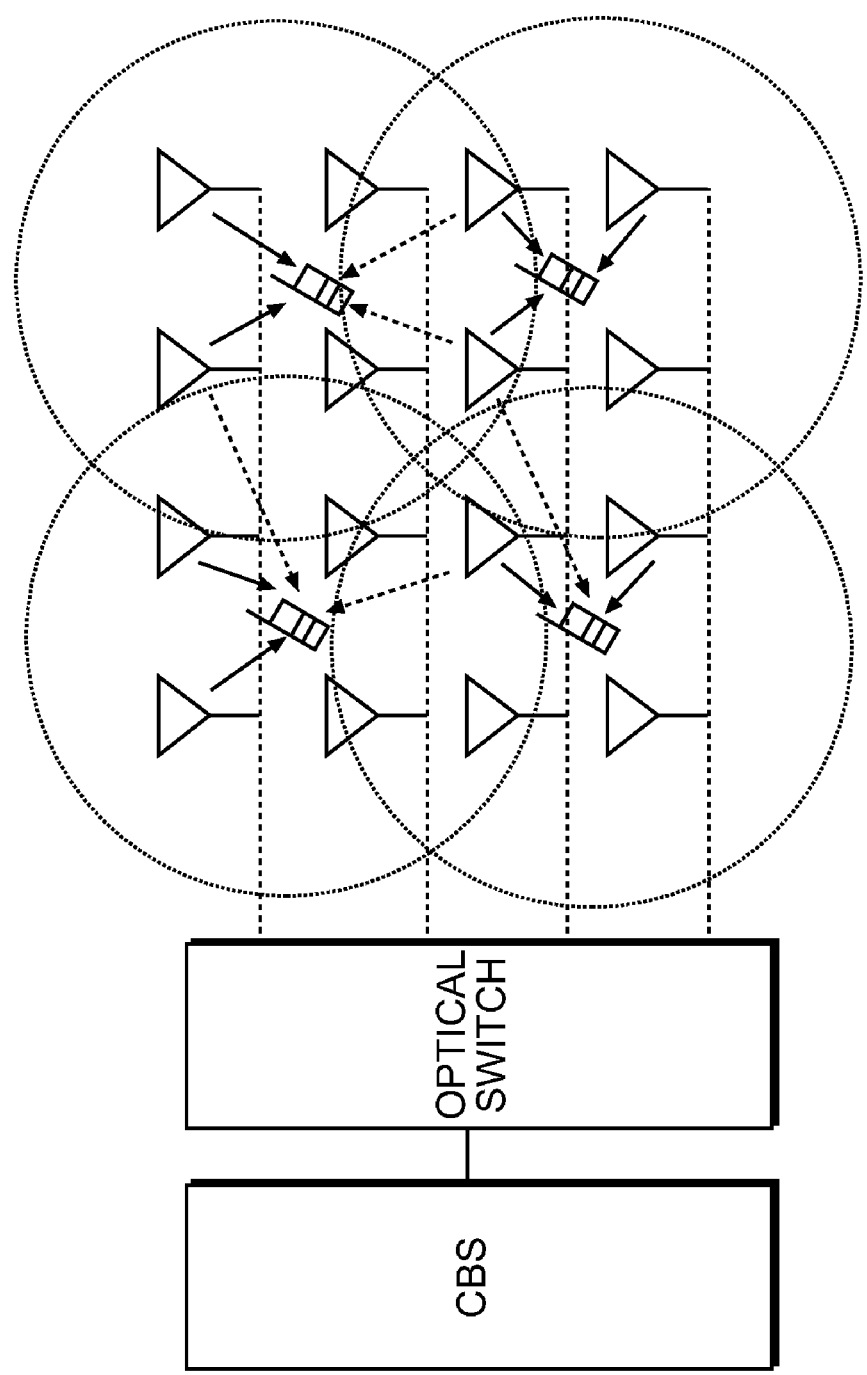
FIG. 4 shows an example of a distributed antenna system managed by a central base station.

FIG. 4 shows an example of a distributed antenna system (DAS) managed by a central Base Station (CBS). Multiple RRHs (remote radio heads) are installed in a geographical region such as an office space inside a subway tunnel. The RRHs are controlled by a CBS via an optical switch or the like. The CBS has the capability to turn the RRHs ON or OFF and also calculates the signal that any of the RRHs has to transmit and sends this information to the RRHs. The RRHs are grouped into clusters represented by the dark circles. FIG. 4 shows four clusters each including four RRHs and one or more UEs. Each cluster of RRHs transmits to one UE or multiple UEs.

Figure 5:
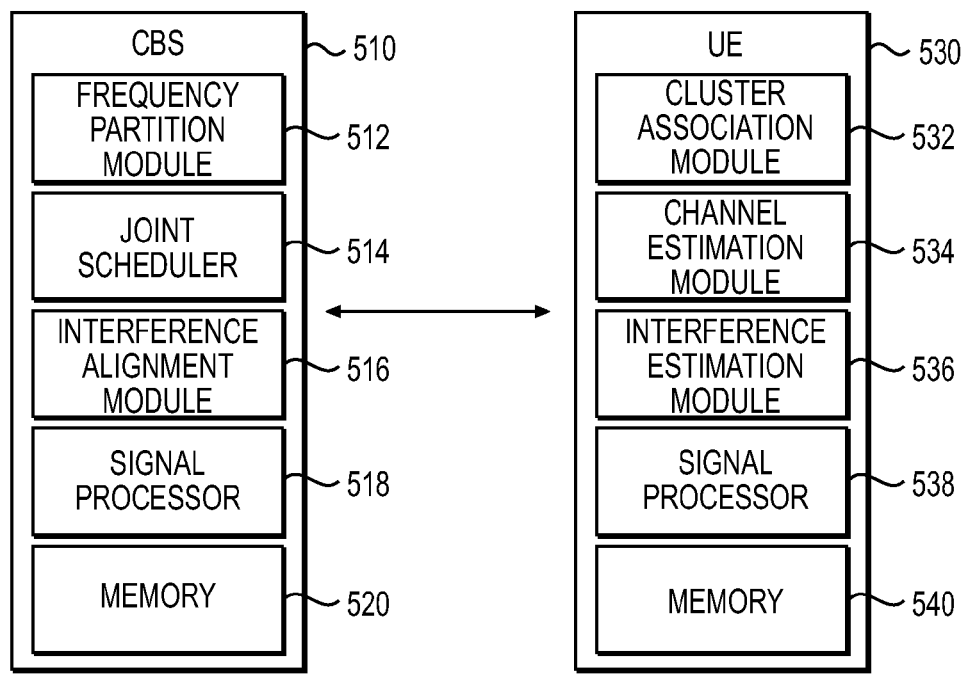
FIG. 5 shows an example of the functional block diagrams of a user and a central base station.

FIG. 5 shows an example of the functional block diagrams of a UE and a CBS. The CBS 510 has a frequency partition module 512, a joint scheduler 514, an interference alignment module 516, a signal processor 518, and a memory 520. The UE 530 has a cluster association module 532, a channel estimation module 534, an interference estimation module 536, a signal processor 538, and a memory 540.

Figure 6:
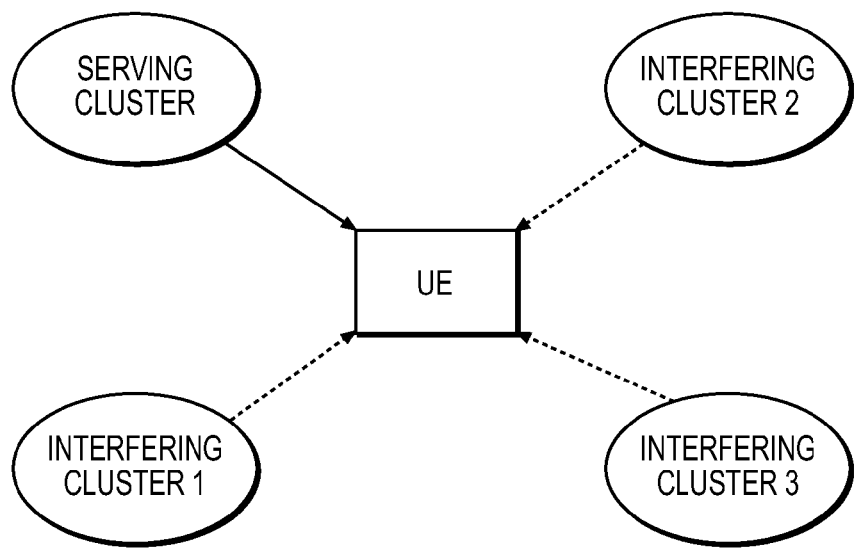
FIG. 6 shows a user communicating with a serving cluster and facing interference from three neighboring interfering clusters in a group.

The functionalities of the various blocks in FIG. 5 are discussed below (in connection with FIGS. 11 and 12). Some of the functionalities are briefly described here. The frequency partition module 512 of the CBS 510 performs cluster formation (e.g., based on geographical considerations) which could be predetermined before actual transmission takes places or could be done jointly with UE scheduling (to select which UEs to activate), and performs frequency partitioning for the clusters by assigning different frequencies to the clusters to minimize interference between the clusters. At the beginning of the communication process, each UE 530 associates itself (via the cluster association module 532) with a cluster as the serving cluster, which subsequently transmits to and receives data from the UE. UE association is done based on received signal strength. That is, a UE monitors the RS (reference signal) power from all clusters and associates itself with the one having the highest power. A UE faces interference from clusters that are transmitting to other UEs. This phenomenon is illustrated in FIG. 6 which shows that a UE communicating with a serving cluster faces interference from three neighboring interfering clusters in a group.

B. Inter-Cluster Interference Management

Interference from neighboring clusters is a major impediment towards achieving high data rate in such systems. It is similar to traditional cellular systems where a UE faces interference from neighboring BSs. However in the distributed antenna system, all clusters of RRHs are coordinated by the CBS, which leads to the possibility of smart signal processing to manage the interference. We propose to use the technique of downlink interference alignment (IA) to manage the interference from neighboring clusters. However, conventional IA algorithms work well when there is only one dominant interferer. According to embodiments of this invention, we propose to apply intelligent frequency partitioning and scheduling, so that for each UE there is one serving cluster and one dominant interfering cluster.

B.1 Cluster Grouping & Frequency Partitioning

Figure 7:
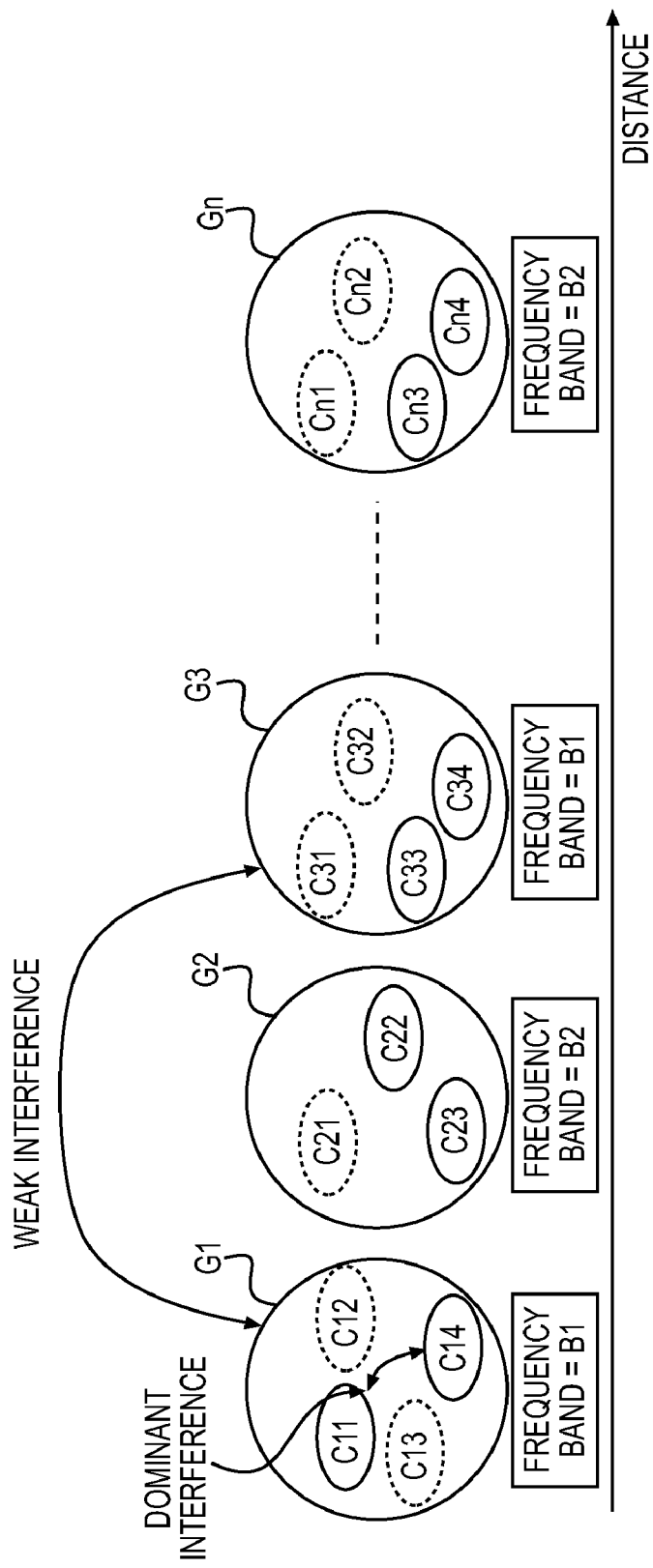
FIG. 7 is a schematic diagram of a distributed antenna system illustrating cluster grouping and frequency partitioning to ensure one dominant interfering cluster per group of clusters of remote radio heads.

As per conventional approach, frequency partitioning involves allocating different frequency bands to different clusters (or cells in cellular networks) so that inter-cluster interference is minimized. In this invention, we propose to relax the criteria of interference elimination while performing frequency partitioning. As such, we require frequency partitioning to be done such that there are multiple neighboring co-channel clusters using the same frequency band as shown in FIG. 7. These co-multiple channel clusters have the potential to cause severe interference to each other. To avoid this, we propose to use downlink scheduling such that there are a maximum of two active co-channel clusters resulting in dominant interference from only one cluster. This is explained in Section B.2 under "Scheduling of UEs and Clusters." The joint scheduler 514 performs the scheduling of all the UEs and clusters by selecting which UEs to activate and which clusters to turn on and turn off.

Next, we employ interference alignment techniques to align the streams in dominant interference so that they occupy in only one dimension. The CBS decides on the frequency reuse factor (i.e., how many different frequency bands are being reused in the network). See, e.g., U.S. Pat. No. 6,917,580 for "Frequency reuse scheme for OFDM system," which is incorporated herein by reference in its entirety. The clusters are grouped into different Groups (Gn) as shown in FIG. 7. All clusters in a given Group use the same frequency band for downlink transmission. Each Group may have multiple clusters depending upon the proximity of clusters. Each Group has a cluster-level scheduler which ensures that, at any given time, a maximum of two clusters are active in the Group. Downlink Interference Alignment technique is used by each cluster to combat the dominant interference arising within the Group.

B.2 Scheduling of UEs and Clusters

Figure 8:
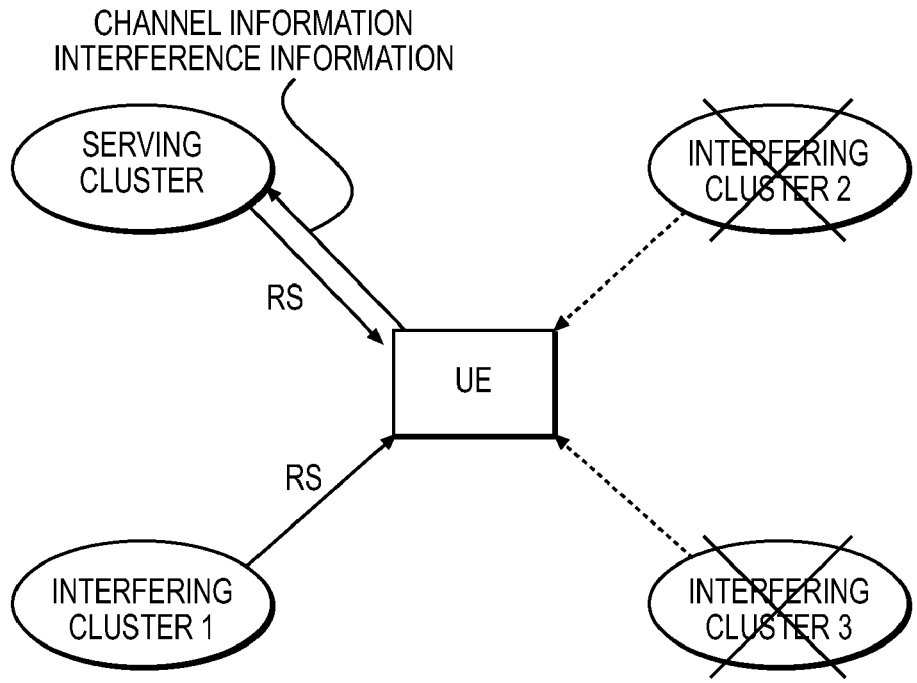
FIG. 8 shows the deactivation of two of the three interfering clusters in the group of FIG. 6 to achieve cluster-based scheduling.

Along with frequency partitioning the CBS can also turn OFF certain clusters so as to prevent them from transmitting to or receiving data from a UE, thus eliminating the interference it would have caused to a neighboring UE-cluster transmission process. For example, in FIG. 6, a UE faces interference from three clusters but if two of them are switched off, the interference is reduced. This is shown in FIG. 8 which illustrates cluster-based scheduling. The proposed scheduling scheme has two components: cluster scheduling and UE scheduling. In cluster scheduling, the cluster association module 532 of the UE 530 chooses one interfering cluster (#1) as the dominant interfering cluster and the other two interfering clusters (#2 and #3) are turned off by the CBS 510. In each frequency group, the number of scheduled clusters is two. This is also shown in FIG. 7 where, within a group, the dotted clusters have been switched off via the scheduling algorithm. After the cluster scheduling is completed in each frequency group, one or more UEs are scheduled for each active cluster based on some existing scheduling scheme, such as, for example, the round-robin scheduling scheme and the proportional fair scheduling scheme disclosed in U.S. Patent Application Publication No. 2007/0248178, "Proportional fair scheduler for OFDMA wireless systems," which is incorporated herein by reference in its entirety. As seen in FIG. 8, the UE sends interference information and channel information to the serving cluster, and receives reference signals (RSs) from the serving cluster and the dominant interfering cluster 1.

Figure 9:
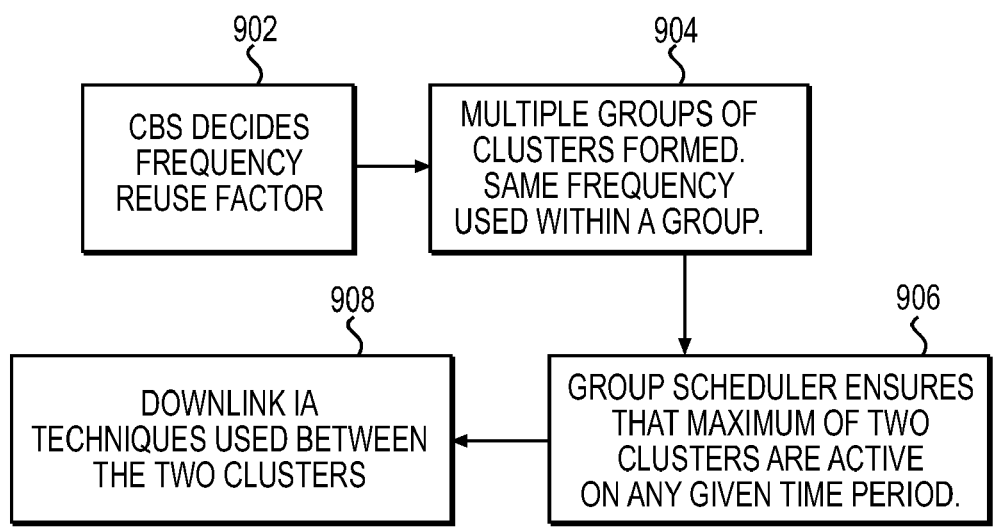
FIG. 9 is an example of a flow diagram illustrating the joint frequency partitioning and cluster scheduling algorithm used in conjunction with downlink interference alignment for interference management.

FIG. 9 is an example of a flow diagram illustrating the joint frequency partitioning and cluster scheduling algorithm used in conjunction with downlink interference alignment for interference management. In step 902, the CBS decides the frequency reuse factor (i.e., how many different frequency bands are being reused in the network). In step 904, multiple groups of clusters of RRHs are formed, and the same frequency is used for the clusters within a group. In step 906, the joint scheduler 514 (or group scheduler or cluster-level scheduler) ensures that a maximum of two clusters are active in any given time period within a group. In step 908, the system uses downlink IA techniques between the two active clusters within the group to align the transmit directions of all interferences, thereby managing the remaining inter-cluster interferences.

C. Channel Estimation

Figure 10:
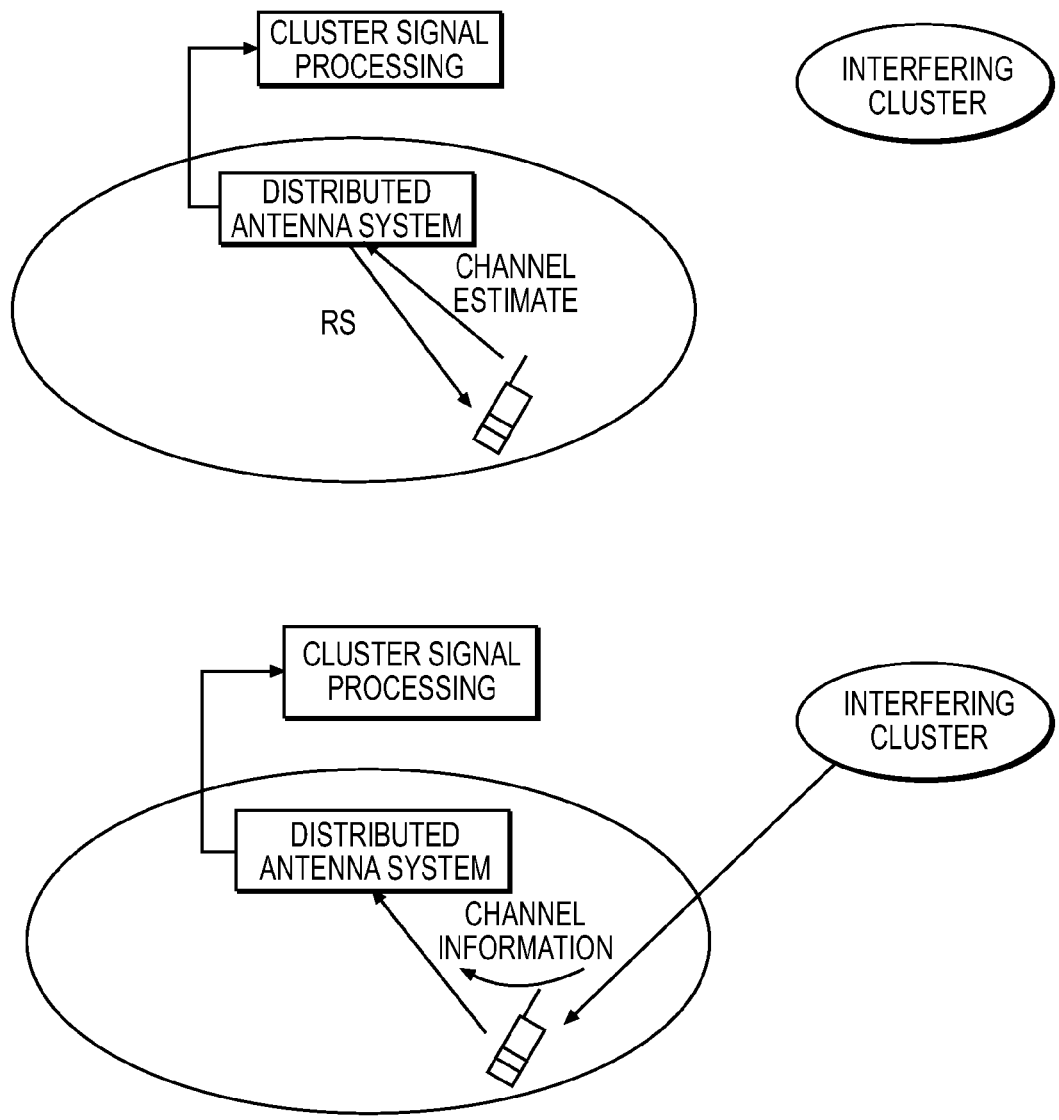
FIG. 10 is a schematic diagram illustrating the channel estimation process for serving and interfering clusters.

A UE has to estimate the channel to its serving cluster and its dominant interfering cluster. This can be achieved within the frameworks of conventional cellular networks such as LTE and LTE-Advanced. See, e.g., 3GPP TR 36.814 V9.0.0, "Further Advancements for E-UTRA Physical Layer Aspects (Release 9)," March 2010, available online: http://ftp.3gpp.org/specs/archive/36_series/36.814/. FIG. 10 is a schematic diagram illustrating the channel estimation process for serving and interfering clusters. The clusters send reference signals (RSs) from different RRHs and the UE can measure the channel from each RRH. The UE and the clusters maintain a common codebook of possible values of the quantized channel. The UE sends back the quantized channel estimate to its serving cluster. Since the serving and interfering clusters are coordinated by the CBS, it can time multiplex the RS transmissions from these two clusters, so that the UE can measure the interference channel in a similar way.

Sometimes measuring the exact nature of interfering channel may be difficult, while it may be easier for the UE to measure the interference channel power. This is related to the average value of the covariance of the interference channel matrix rather than the instantaneous matrix itself. We note that measuring channels to multiple clusters is related to the channel measurements in LTE-Advanced CoMP and algorithms proposed for the latter can be used for the former.

D. Interference Alignment

Through frequency partitioning and cluster scheduling, each UE sees only one dominant interfering cluster and its serving cluster. The CBS can instruct these two clusters to perform IA algorithm as described above. This would result in efficient interference management and yield high rates. In this invention, we propose a modification of the conventional IA in order to reduce UE complexity. In conventional downlink IA, the UE measures the channel and figures out the receiver filter and conveys the information of the effective channel (actual channel processed by the receiver filter) to the transmitter. This would require extra signal processing at the receiver. Following guidelines from existing cellular standards, we relegate the signal processing at the transmitter which is the CBS. The UE informs the serving cluster about its channels to the serving and interfering clusters. The CBS calculates the receiver filters and sends this information to the UE prior to transmission of actual data. This could be done via pre-coded RS, such as DMRS (Demodulation Reference Signal) used in LTE (Long Term Evolution) and LTE-Advanced (see 3GPP TR 36.814 V9.0.0 referenced above). The functionalities of the UE and the CBS are illustrated respectively in FIGS. 11 and 12.

Figure 11:
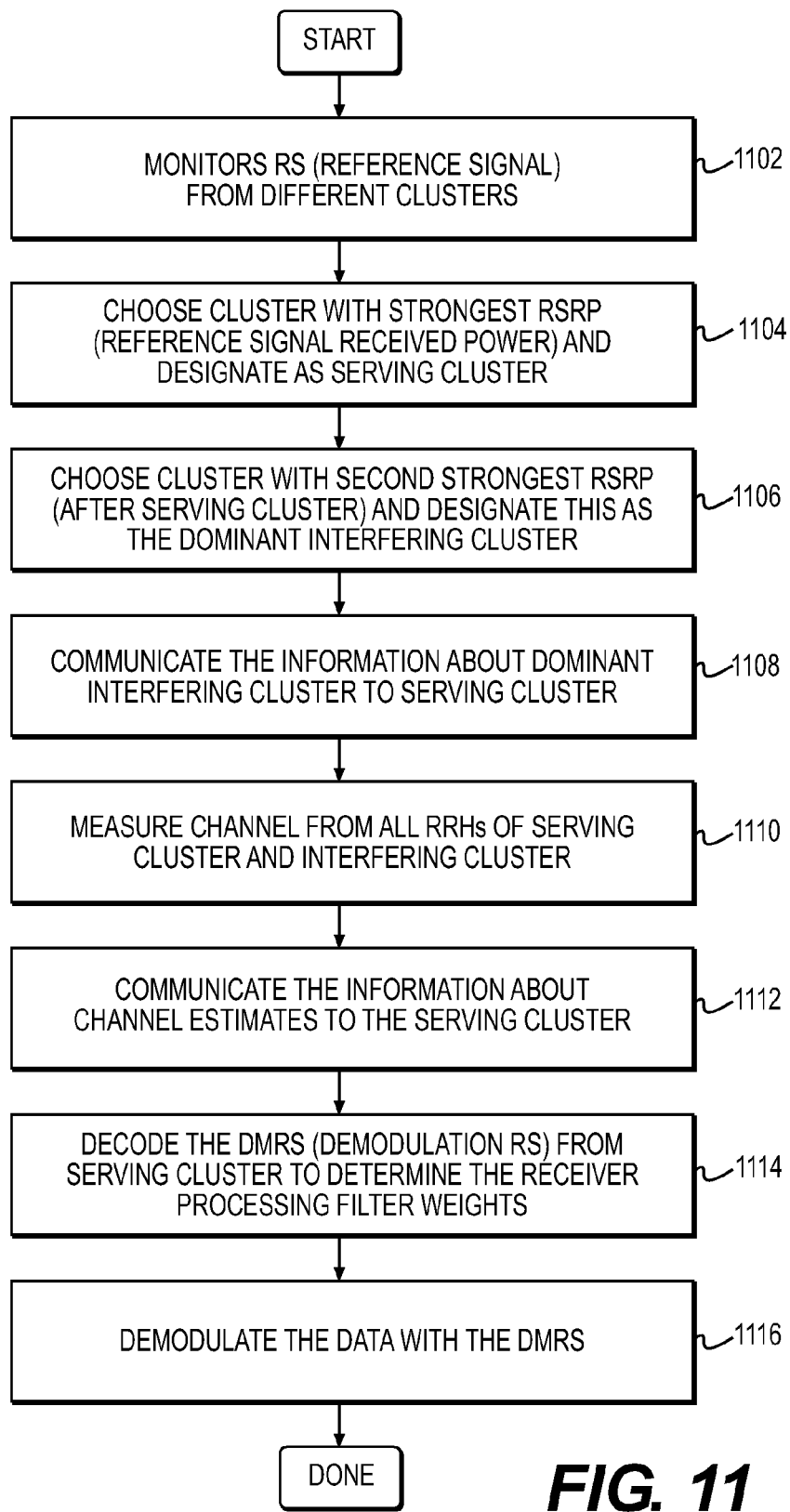
FIG. 11 is an example of a flow diagram illustrating UE functionality for interference management in a distributed antenna system.

FIG. 11 is an example of a flow diagram illustrating UE functionality for interference management in a distributed antenna system. The steps in FIG. 11 are performed by a UE. FIG. 12 is an example of a flow diagram illustrating CBS functionality for interference management in a distributed antenna system. The steps in FIG. 12 are performed by the CBS although some of the steps may be performed by the cluster(s) (according to the CBS instructions) instead as noted below.

In step 1202, the CBS performs frequency partitioning and cluster formation (see Section B.1 above). In step 1204, the CBS sends the reference signals (RSs) for each cluster which are then broadcasted to the UEs. In step 1102, the UE monitors the RSs from different clusters. In step 1104, the UE chooses a cluster with the strongest Reference Signal Received Power (RSRP) and designates it as the serving cluster. In step 1106, the UE chooses the cluster with the second strongest RSRP and designates it as the dominant interfering cluster. In step 1108, the UE communicates the information on the dominant interfering cluster to the serving cluster. In step 1206, based on subsequent UE feedback, the CBS determines the UE association to each cluster and the dominant interfering cluster for each UE (or the serving cluster makes the determination and informs the CBS).

In step 1110, the UE in each group measures the channels from all RRHs of the serving cluster and the dominant interfering cluster (see channel estimation in Section C above), which includes interference estimation by measuring the interference channel power. In step 1112, the UE communicates the channel information on channel estimation and interference estimation to the serving cluster. In step 1208, the CBS receives the channel information about the serving cluster and the dominant interfering cluster for each UE (the serving cluster in each group may be involved in receiving the information from the UE in the group and forwarding the information to the CBS). In step 1210, the CBS performs joint scheduling of the UEs and clusters by scheduling the active cluster in each frequency group and the active UE(s) in each scheduled cluster (see Section B.2 above) based on the received information on the UEs and clusters.

Figure 3:
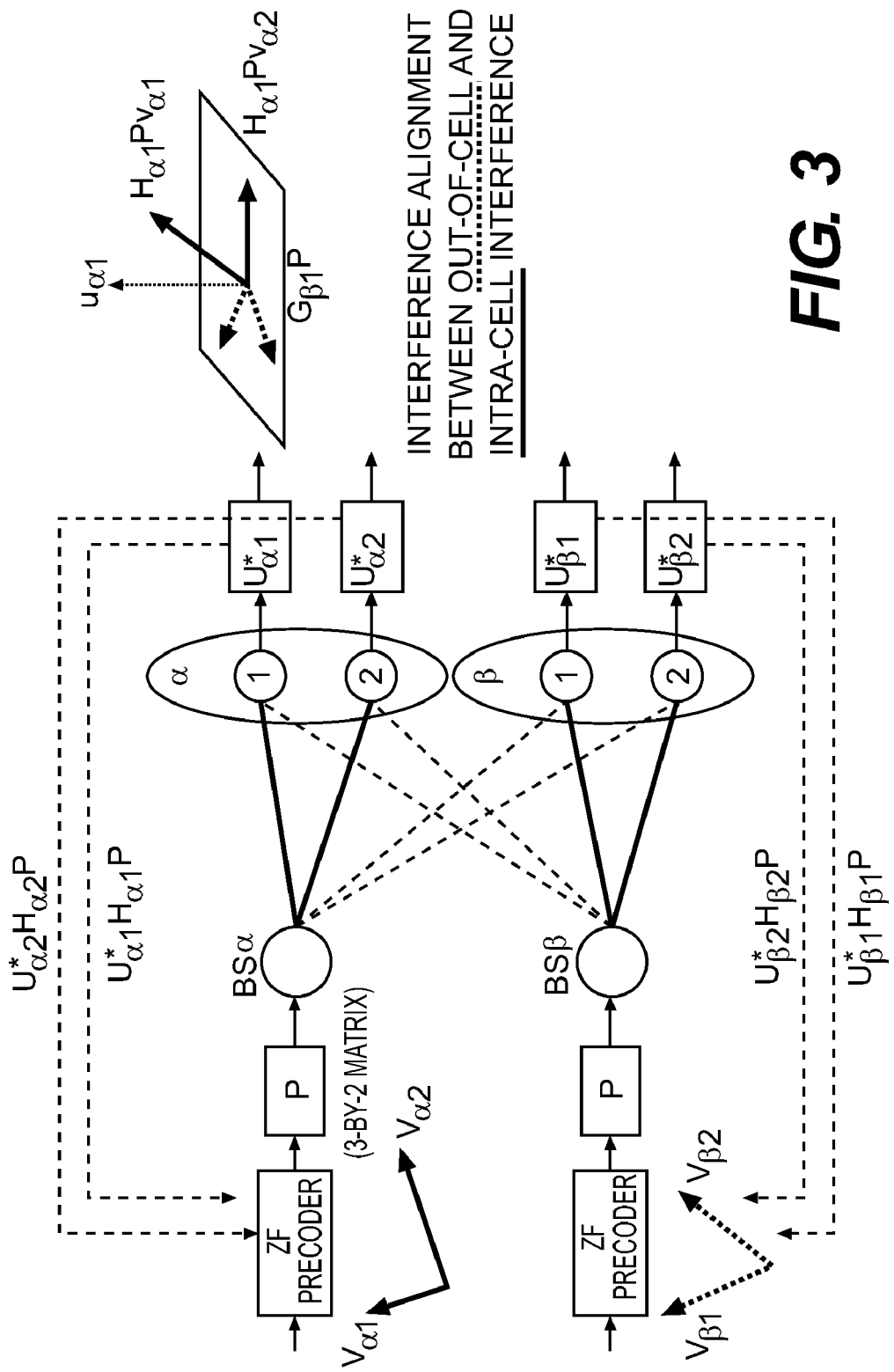
FIG. 3 shows the illustration of a two-cell network with two base stations each employing a fixed precoder in a downlink interference alignment scheme.

In step 1212, the CBS determines the transmitter and receiver processing filter weights for interference alignment (e.g., see description of FIG. 3 above including weights $u^*_{\alpha1}$, $u^*_{\alpha2}$, $u^*_{\beta1}$, $u^*_{\beta2}$). Alternatively, the UE can determine the receiver processing filter weights and provide them to the CBS. Assigning this task to the CBS instead of the UE has the advantage of reducing UE complexity. Based on the receiver filter calculation performed in step 1212, the CBS in step 1214 encodes the receiver filter information in the DMRS for each UE and sends the DMRS and data to the clusters for transmission to the UE (e.g., in a packet or frame). In step 1114, the UE decodes the DMRS received from the CBS via the serving cluster in order to determine the receiver processing filter weights encoded in the DMRS (or IA beamforming weights). In step 1116, the UE demodulates the data contained in the received packet or frame using the DMRS in the packet or frame.

Figure 12:
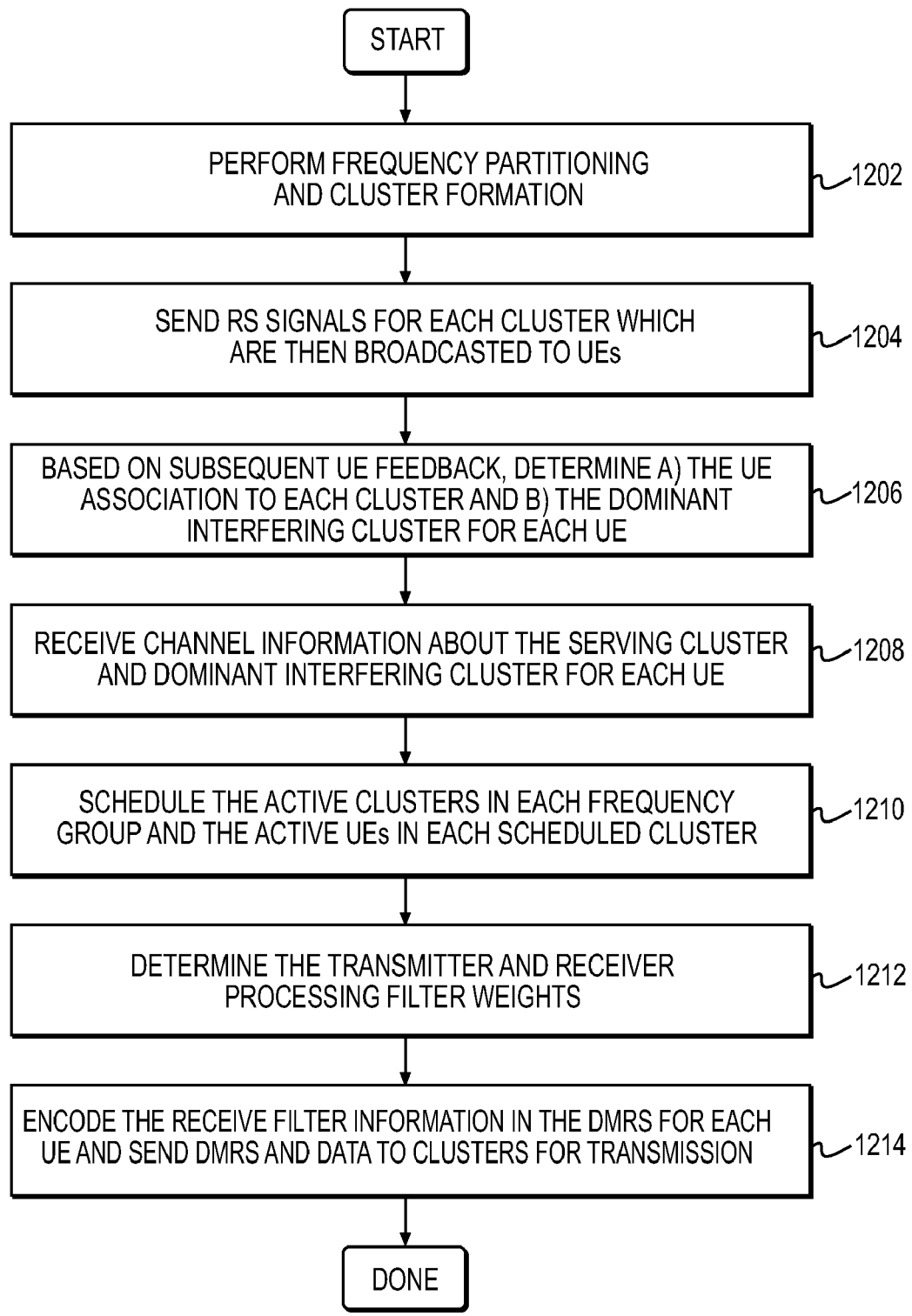
FIG. 12 is an example of a flow diagram illustrating CBS functionality for interference management in a distributed antenna system.

With reference to FIG. 5 and FIG. 12, step 1202 is performed by the frequency partition module 512 and step 1204 is performed by the signal processor 518 of the CBS 510. The signal processor 518 further receives the cluster information in step 1206 and the channel estimates information in step 1208. The joint scheduler 514 performs joint scheduling of the UEs and clusters in step 1210. The interference alignment module 516 determines the filter weights in step 1212. The signal processor 518 encodes the receiver filter information in step 1214 and sends the DMRS and data to the clusters for transmission to the UE in step 1216.

With reference to FIG. 5 and FIG. 11, the cluster association module 532 of the UE 530 performs steps 1102, 1104, 1106, and 1108 to communicate the information on the dominant interfering cluster to the serving cluster. The channel estimation module 534 performs channel estimation and the interference estimation module 536 performs interference estimation in step 1110, and they respectively communicate the channel estimation information and interference estimation information to the serving cluster in the group as channel information in step 1112. The signal processor 538 performs the decoding in step 1114 and the demodulating in step 1116.

This invention outlines a method of managing interference in distributed antenna systems. The methods used could also be applied to future cellular systems with base station coordination. Both these scenarios are mentioned in the LTE-Advanced standard of cellular communications. The techniques presented above can lead to efficient operation of these systems.

Of course, the distributed antenna system shown in FIG. 4 and the functional block diagram illustrated in FIG. 5 are purely exemplary of systems in which the present invention may be implemented, and the invention is not limited to a particular hardware or software configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for interference management in distributed antenna systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A central base station for interference management in a distributed antenna system which includes a plurality of users and a plurality of remote radio heads, the central base station comprising:

a processor;

a memory;

a frequency partition module configured to divide the remote radio heads into clusters and allocate a frequency band to each cluster so that remote radio heads in each cluster have the same frequency band, wherein multiple clusters use the same frequency band and groups of clusters are formed, each group of clusters using the same frequency band;

a joint scheduler configured, for each group, to activate at most two clusters at any given time and deactivate remaining clusters in the group, one of the at most two activated clusters being a serving cluster of the group, and to associate one or more users with the serving cluster in the group; and an interference alignment module configured to apply downlink interference alignment between the at most two activated clusters in each group to align transmit directions of all interferences between the at most two activated clusters;

wherein each group has one serving cluster and at most one interfering cluster, the serving cluster having first strongest Reference Signal Received Power in the group and the at most one interfering cluster having the second strongest Reference Signal Received Power in the group.

2. The central base station according to claim 1, wherein the frequency partition module decides on a frequency reuse factor which determines how many different frequency bands are being reused among the groups of clusters in the distributed antenna system.

3. The central base station according to claim 1, wherein the joint scheduler is configured, for each group, to activate at most two clusters at any given time and deactivate remaining clusters and to associate one or more users with the serving cluster in the group, based on channel information provided by the users about the clusters in the group including channel information of the serving cluster and the at most one interfering cluster.

4. The central base station according to claim 1, wherein the interference alignment module is configured to determine receiver processing filter weights for downlink interference alignment, encode the receiver processing filter weights in the DMRSs (Demodulation Reference Signals) for the users, and send the DMRSs and data to the clusters for transmission to the users.

5. A method for interference management in a distributed antenna system which includes a central base station, a plurality of users, and a plurality of remote radio heads, the method comprising:

dividing the remote radio heads into clusters;

allocating a frequency band to each cluster so that remote radio heads in each cluster have the same frequency band, wherein multiple clusters use the same frequency band and groups of clusters are formed, each group of clusters using the same frequency band;

activating at most two clusters at any given time and deactivating remaining clusters in each group, one of the at most two activated clusters being a serving cluster of the group;

associating one or more users with the serving cluster in the group; and applying downlink interference alignment between the at most two activated clusters in each group to align transmit directions of all interferences between the at most two activated clusters;

wherein each group has one serving cluster and at most one interfering cluster, the serving cluster having first strongest Reference Signal Received Power in the group and the at most one interfering cluster having the second strongest Reference Signal Received Power in the group.

6. The method according to claim 5, wherein allocating the frequency band comprises deciding on a frequency reuse factor which determines how many different frequency bands are being reused among the groups of clusters in the distributed antenna system.

7. The method according to claim 5, further comprising: monitoring reference signals from the clusters by the users; and based on the monitoring, identifying by each user a cluster with the first strongest Reference Signal Received Power and a cluster with the second strongest Reference Signal Received Power for the user.

8. The method according to claim 5, wherein activating at most two clusters at any given time and deactivating remaining clusters and associating one or more users with the serving cluster in the group are performed based on channel information provided by each user about the clusters in the group including channel information of the serving cluster and the at most one interfering cluster.

9. The method according to claim 8, further comprising: measuring by each user channels from the remote radio heads in the serving cluster and the at most one interfering cluster in the group to obtain the channel information; and providing the channel information to the central base station to be used for the activating, deactivating, and associating.

10. The method according to claim 5, wherein applying downlink interference alignment comprises determining receiver processing filter weights for downlink interference alignment, encoding the receiver processing filter weights in DMRSs (Demodulation Reference Signals) for the users, and sending the DMRSs and data to the clusters for transmission to the users.

11. The method according to claim 10, further comprising: decoding the DMRS to determine the receiver processing filter weights and demodulating the data using the DMRS.

12. A distributed antenna system comprising a central base station, a plurality of users, and a plurality of remote radio heads, wherein the central base station includes:

a processor;

a memory;

a frequency partition module configured to divide the remote radio heads into clusters and allocate a frequency band to each cluster so that remote radio heads in each cluster have the same frequency band, wherein multiple clusters use the same frequency band and groups of clusters are formed, each group of clusters using the same frequency band;

a joint scheduler configured, for each group, to activate at most two clusters at any given time and deactivate remaining clusters in the group, one of the at most two activated clusters being a serving cluster of the group, and to associate one or more users with the serving cluster in the group; and an interference alignment module configured to apply downlink interference alignment between the at most two activated clusters in each group to align transmit directions of all interferences between the at most two activated clusters;

wherein each group has one serving cluster and at most one interfering cluster, the serving cluster having first strongest Reference Signal Received Power in the group and the at most one interfering cluster having the second strongest Reference Signal Received Power in the group.

13. The distributed antenna system according to claim 12, wherein the frequency partition module decides on a frequency reuse factor which determines how many different frequency bands are being reused among the groups of clusters in the distributed antenna system.

14. The distributed antenna system according to claim 12, wherein each user includes:
a user processor;
a user memory; and
a cluster association module configured to monitor reference signals from the clusters and, based on the monitored reference signals, identify a cluster with the first strongest Reference Signal Received Power and a cluster with the second strongest Reference Signal Received Power for the user.

15. The distributed antenna system according to claim 12, wherein the joint scheduler is configured, for each group, to activate at most two clusters at any given time and deactivate remaining clusters and to associate one or more users with the serving cluster in the group, based on channel information provided by the users about the clusters in the group including channel information of the serving cluster and the at most one interfering cluster.

16. The distributed antenna system according to claim 15, wherein each user in a group further includes:

a channel estimation module configured to perform channel estimation of the remote radio heads in the serving cluster in the group; and
an interference estimation module configured to perform interference estimation of the remote radio heads in the at least one interfering cluster in the group;
wherein the channel information including the channel estimation and the interference estimation is provided by the user to the joint scheduler of the central base station to be used for the activating, deactivating, and associating.

17. The distributed antenna system according to claim 12, wherein the interference alignment module is configured to determine transmitter and receiver processing filter weights for downlink interference alignment, encode the receiver processing filter weights in the DMRSs (Demodulation Reference Signals) for the users, and send the DMRSs and data to the clusters for transmission to the users.

18. The distributed antenna system according to claim 17, wherein each user includes a signal processor configured to decode the DMRS to determine the receiver processing filter weights and to demodulate the data using the DMRS.

* * * * *